United States Patent [19]
Delfino

[11] Patent Number: 5,960,943
[45] Date of Patent: Oct. 5, 1999

[54] BLOCK STRUCTURE PROVIDING AN OUTWARDLY-EXTENDED SURFACE FOR ACTIVATING A VEHICULAR HORN SWITCH

[76] Inventor: Nicholas Anthony Delfino, 2403-J3 Antigua Cir., Coconut Creek, Fla. 33066

[21] Appl. No.: 08/887,476

[22] Filed: Jul. 2, 1997

Related U.S. Application Data

[60] Provisional application No. 60/021,482, Jul. 30, 1996.

[51] Int. Cl.⁶ ............................................ H01H 3/12
[52] U.S. Cl. ............................................ 200/330; 200/333
[58] Field of Search .................................. 200/330, 331, 200/333, 61.54

[56] References Cited

U.S. PATENT DOCUMENTS

| | | | |
|---|---|---|---|
| 3,927,282 | 12/1975 | Firstenberg | 200/333 X |
| 5,317,986 | 6/1994 | Blanes | 200/333 X |
| 5,498,844 | 3/1996 | Chan | 200/331 |

*Primary Examiner*—Renee S. Luebke
*Attorney, Agent, or Firm*—Ronald V. Davidge

[57] ABSTRACT

An improved actuation structure for a vehicle horn switch is formed as a block adhesively attached to extend outward from the surface, such as a button flush with surrounding surfaces, or a flexible cover, otherwise used to actuate the horn switch.

1 Claim, 1 Drawing Sheet

BLOCK STRUCTURE PROVIDING AN OUTWARDLY-EXTENDED SURFACE FOR ACTIVATING A VEHICULAR HORN SWITCH

This application claims the benefit of U.S. provisional Application Ser. No. 60/021,482, filed Jul. 03, 1996.

BACKGROUND OF THE INVENTION

1. Field of the Invention

This invention relates to a block structure providing an outwardly-extended actuation surface for an electric switch, and, more particularly, to a such a device in a form attachable to a flush-mounted automotive horn switch assembly.

2. Background Information

Before the widespread installation of driver-side air bags, vehicular horns were generally operated by mechanisms which were effectively concentric with the rotational axis of the steering wheel. One type of such a concentric mechanism is a ring extending mostly or completely around the rotational axis of the steering wheel between the central portion thereof and the steering wheel rim, which is used to steer the vehicle. The depression of such a ring caused the actuation of the vehicle horn. Another type of such a concentric mechanism includes a plate or flexible surface which is depressed at or near the center of rotation of the steering wheel to actuate the horn. A significant advantage of such a concentric mechanism is that the position of the horn actuator does not depend on the rotational position of the steering wheel.

The installation of a driver-side airbag requires establishment of an air bag compartment in a central region of the steering wheel, occupying much of the space within the steering wheel. The outer surface of this compartment must be a door which opens to allow deployment of the air bag in the event of a collision. To provide room for this compartment and door, the horn actuation mechanism was generally provided in the form of a pair of switch-actuating buttons moved outward along a crossbar extending between the wheel rim and the central rotatable means with which the steering wheel is mounted. In many instances, these buttons were mounted so that, when the horn switch was not actuated, the outer surfaces of the buttons were flush with the surrounding surfaces, which may include a button-mounting bezel and a surface of the crossbar.

A particular problem with this type of horn actuation is that these buttons cannot be easily located when the steering wheel is turned from its normal position, by which the wheels of the vehicle are aligned to move the vehicle straight forward. A typical emergency driving situation requires swerving the vehicle to avoid another vehicle or a pedestrian while sounding the horn to warn the other driver or pedestrian. However, to swerve the vehicle, the driver must move both his hands and the steering wheel in such a way that the horn buttons on the crossbar cannot be readily located. This presents a problem during both the night and day, since the driver can rarely afford to look away from a developing emergency driving situation. What is needed is a structure establishing tactile feedback concerning the location of the horn actuation buttons regardless of the movement of the steering wheel.

Another type of horn actuating surface presented within vehicles uses a flexible cover, not having a visible button, over a portion of the steering wheel. When this cover is depressed in the correct place, the horn is sounded. This correct place is typically identified with an icon, such as a picture of a horn. However, this type of identification provides little if any assistance at night or during an emergency situation. Thus, what is needed is a structure establishing tactile feedback concerning the location of the portion of the flexible cover which must be depressed to actuate the vehicle horn.

SUMMARY OF THE INVENTION

A first objective of the present invention is to provide a structure extending outward from a vehicle horn actuating surface to allow the ready location of that surface by tactile means.

A second objective of the invention is to provide such a structure in a form which may be easily added to a vehicle by its owner or operator, or by a maintenance person, without a need to disassemble structures of the vehicle.

In accordance with one aspect of the invention, there is provided an improved structure for manual switch actuation in a switch assembly having a first external surface for manual actuation of a switch within the switch assembly. The improved structure includes an outwardly-extended actuation surface, an attachment surface, opposite the outwardly-extended attachment surface, and an adhesive coating, extending along the attachment surface, attaching the improved structure to the first external surface.

In accordance with another aspect of the invention, there is provided an improved actuation structure in a vehicular horn switch assembly having a switch actuated by depressing a button from a position in which an outer surface of the button extends flush with surrounding surfaces. The improved actuation structure includes an attachment surface adhesively attached to the outer surface of the button, an actuation surface displaced outwardly from the attachment surface, and peripheral sides extending between the attachment surface and the actuation surface.

DETAILED DESCRIPTION

Figure 1:
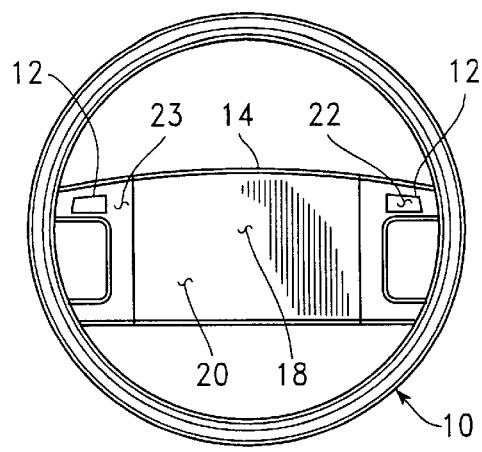
FIG. 1 is a plan view of a prior art steering wheel including horn actuation switch assemblies to which the present invention is readily applied.

FIG. 1 is a plan view of a conventional vehicle steering wheel 10 including a pair of buttons 12, either of which is used to actuate the vehicle horn, to which the present invention may be readily applied. These buttons 12 are mounted, in an inwardly slidable fashion, near corners of a crossbar 14, extending between the steering wheel rim 16 and its axis of rotation 18. The central portion 20 of the crossbar 14 covers an airbag (not shown). In this example, the outer surfaces 22 of the buttons 12 are flush with the surrounding surfaces 23 of the crossbar 14.

While the horn buttons 12 are generally easily located with the steering wheel in the angular orientation of FIG. 1

(i.e. with the vehicle moving straight forward), a particular problem occurs when the wheel is turned through a significant angle from this orientation. To operate the horn with the wheel turned, it is first necessary to locate the crossbar 14 and then to locate one of the buttons 12 on the crossbar 14. Locating the buttons 12 is particularly difficult, since their outer surfaces 22 are flush with the surrounding surfaces 23.

When the steering wheel 10 is in the angular orientation of FIG. 1, it is generally easy to depress one of the buttons 12 using an adjacent thumb, which fits partly into the slot surrounding the button as it is depressed. However, when the steering wheel has been rotated to another angular orientation, it is often difficult to depress a button 12, since the slot in which the button operates is not aligned with any thumb or finger.

Figure 2:
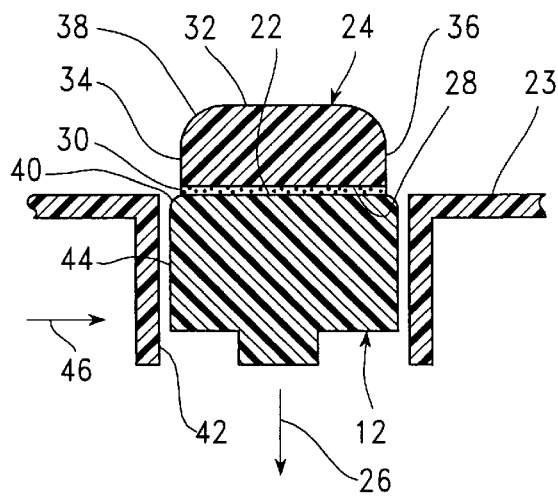
FIG. 2 is a lateral cross-sectional view of a conventional switch button used to actuate an automobile horn, together with an improved actuation structure in accordance with the present invention.

FIG. 2 is a lateral cross-sectional view of one of the conventional horn buttons 12, together with an improved actuation structure 24 according to the present invention. The button 12 is mounted to slide inward, in the direction of arrow 26, when it is manually depressed, bringing about the actuation of a switch (not shown), which in turn causes operation of the vehicle horn. The type and location of the switch need not be considered so long as it is actuated by motion of the button in the direction of arrow 26. When the button 12 is not depressed, its outer surface 22 is flush with the surrounding surfaces 23.

The improved actuation structure 24 is in the form of a block having an attachment surface 28 fastened to the outer surface 22 of the button 12 by means of an adhesive layer 30. The outer surface 32 of the actuation structure 24 provides an actuation surface which is displaced upward from the outer surface 22 of the button 12. Peripheral sides 34, 36 extend between the attachment surface 28 and the outer surface 32, with a fillet 38 extending along each edge between the side 34, 36 and the outer surface 32. Each peripheral side 34, 36 preferably extends parallel to an adjacent edge 40 of the outer button surface 22, being displaced laterally inward from the adjacent edge 40 to avoid contact with the structural surfaces 42 extending downward along the sides 44 of the button 12. That is, the peripheral side 34 is displaced in the direction of arrow 46, while side 36 is displaced opposite the direction of arrow 46.

Referring to FIGS. 1 and 2, the actuation structure 24 preferably has the general shape of the button 12 to which it is attached, having, for example, four lateral sides 34, 36 which are not necessarily parallel to one another. In many situations, a pair of actuation structures 24 may be provided, being mirror images of one another to match the right and left horn buttons of a particular vehicle model. The actuation structures 24 are preferably provided with the adhesive layer 30 in the form of a pressure-sensitive adhesive having a protective layer (not shown) which is peeled away and discarded before the structures 24 are applied to the corresponding buttons 22. Alternately, the actuation structures 24 may be attached using other adhesive materials well known to those skilled in the art, such as cyanoacrylate materials or epoxy materials.

Figure 3:
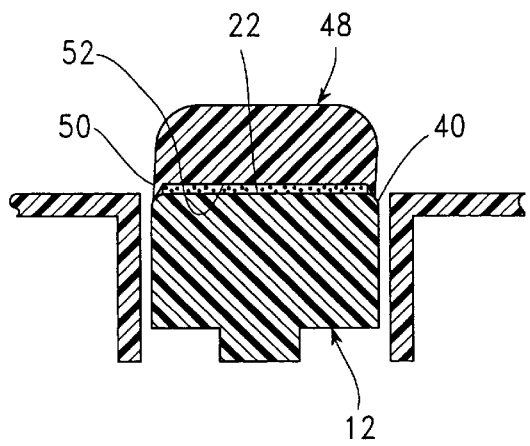
FIG. 3 is a lateral cross-sectional view of the conventional slider of FIG. 2, together with an alternative actuation structure in accordance with the present invention.

FIG. 3 is a lateral cross-sectional view of one of the conventional horn buttons 12, together with an alternative improved actuation structure 48 according to the present invention. This alternative actuation structure 48 includes a peripheral ridge 50 extending completely or partly around an attachment surface 52 to aid in properly locating the structure 48 by fitting over the edges 40 of outer surface 22 of the button 12. This alternative structure 48 is otherwise similar to the structure 24, which has been described above in reference to FIGS. 1 and 2.

Figure 4:
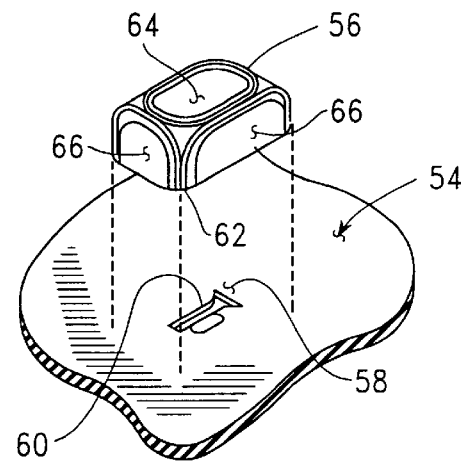
FIG. 4 is an isometric view of a flexible cover used to actuate an automobile horn, in an exploded relationship with an improved actuation structure in accordance with the present invention.

FIG. 4 is an isometric view of a flexible cover 54, which is depressed in a correct place to actuate an automobile horn, in an exploded relationship with an improved actuation structure 56 in accordance with the present invention. The flexible cover 54 forms part of the steering wheel assembly (otherwise not shown), having a switch which is actuated by the depression of the cover 54 in the correct place 58. An icon 60, in the shape, for example, of a horn, is provided to assist in locating the correct place 58 for depressing the cover 54 to actuate the horn. However, this type of identification provides little assistance at night or during an emergency situation in which the wheel is rotated to turn the vehicle. Thus, the improved actuation structure 54, which is similar to the structure 24 discussed above in reference to FIGS. 1 and 2, is adhesively attached to the flexible cover 54 at the correct place 58 for horn actuation.

The actuation structure 56 need not follow the shape of a particular horn button, being instead formed generally as a rectangular parallelepiped having fillets 62 extending along edges between an upper surface 64 and peripheral sides 66 and along edges between adjacent peripheral sides 66. This fillet arrangement between adjacent peripheral sides is preferably also employed in the formerly discussed actuation structures 24, 48.

In each case the attachment of an improved actuation structure provides the driver with a ready means for finding and depressing a surface actuating the vehicle horn in the dark, when the steering wheel is turned, and when swerving to avoid an obstacle in an emergency situation. The fillets keep the actuation structure from catching on the clothing of the driver as the wheel is turned. The improved actuation structures can be easily installed by the owner or operator of a vehicle, or by service personnel, without a need for disassembling the horn actuation system.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

what is claimed is:

1. In a vehicular horn switch assembly having a switch actuated by depressing a button from a position in which an outer surface of said button extends flush with surrounding surfaces, an improved actuation structure comprising:

an attachment surface adhesively attached to said outer surface of said button;

an actuation surface displaced outwardly from said attachment surface;

peripheral sides extending between said attachment surface and said actuation surface, wherein each of said peripheral sides extends in alignment with a corresponding edge of said outer surface of said button; and a peripheral ridge extending around and downward from said attachment surface, engaging edges of said outer surface of said button to align said improved actuation structure with said button.

* * * * *